(12) United States Patent
Ruggiero et al.

(10) Patent No.: US 8,103,677 B1
(45) Date of Patent: Jan. 24, 2012

(54) SEARCHING USING OBJECT LINKED ENTERPRISE SYSTEM

(75) Inventors: Jon Ruggiero, Walnut Creek, CA (US); Kashif Qayyum, Fremont, CA (US)

(73) Assignee: Workday, Inc., Pleasanton, CA (US)

( * ) Notice: Subject to any disclaimer, the term of this patent is extended or adjusted under 35 U.S.C. 154(b) by 272 days.

(21) Appl. No.: 12/069,156

(22) Filed: Feb. 6, 2008

(51) Int. Cl.
*G06F 17/30* (2006.01)

(52) U.S. Cl. .......................... 707/748; 707/758

(58) Field of Classification Search .......... 707/705–710, 707/713, 716, 718, 722–728, 748–759
See application file for complete search history.

(56) References Cited

U.S. PATENT DOCUMENTS 6,470,344 B1 * 10/2002 Kothuri et al. ................ 707/696
6,704,729 B1 * 3/2004 Klein et al. ............. 707/999.005

OTHER PUBLICATIONS

Microsoft Press Computer Dictionary, Microsoft Press, 3rd edition, 1997, p. 469.*

* cited by examiner

*Primary Examiner* — Wilson Lee
(74) *Attorney, Agent, or Firm* — Van Pelt, Yi & James LLP (57) ABSTRACT

Searching in an object-based database system is disclosed. Searching includes identifying one or more matching objects matching one or more terms of a search request in a search index and executing one or more return path methods associated with each of the one or more matching objects. Each of the one or more return path methods traverses an object tree and returns a parent object. The parent object is added to a list of search result parent objects. Searching further includes ranking the list of search result parent objects according to a ranking function and providing the ranked list of search result parent objects.

27 Claims, 9 Drawing Sheets

SEARCHING USING OBJECT LINKED ENTERPRISE SYSTEM

BACKGROUND OF THE INVENTION

Databases often contain large numbers of vitally important records for a company. These records can include human resource, corporate, financial, legal, medical, and other records. Implementations of an enterprise database system typically use table-based data structures to store the records. Table-based structures are naturally suited to searching the entire database for a given piece of data or to producing sorted lists of data; however, they are not practical for some other database functions such as logging and security. Specifically, if it is desirable to maintain a log of the changes to each piece of data over time, use of a table-based data structure will result in an inefficient use of storage space, as entire rows are duplicated whenever a single piece of data is modified. In addition, table-based data structures also do not adapt easily to the use of a security model, where different database users are allowed access to different subsets of the data depending on their level of security access.

In contrast, storing information in an object-based database, in which information is stored over a large collection of linked objects rather than in a single large table, allows a security model to be enforced by restricting users access to certain parts of the database, and also allows efficient logging of data modifications by maintaining a log of changes to each object within the object itself. However, searching an object-based database, due to its distributed nature, may not be as simple or as efficient as searching a table-based database.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Searching in an object-based database system is disclosed. The object-based database system stores data as a large network of objects. Each object may contain attributes associated with it, methods for operating on the object, and relations to other objects. Higher-level objects collect logically related objects together to form structures. For instance, a business organization object might be connected to a name object containing the business name and to a location object containing the business location, and also be connected to several group objects representing groups within the business. Each group object might be connected to its own attribute objects as well as to several person objects, and so on. A search index is maintained, listing an object name and a reference to that object. A keyword search of the index may return many objects matching one or more of the keywords; however, the desired search target is the likely to be one of the higher-level objects which has a relation to the object matching the one or more keywords, rather than the object itself. For instance, if a user searches for the business name, the name object containing the business name will be found. The user is not looking for the name object, however, but for the business object itself. In order to make this connection, objects have associated with them one or more weighted return path methods to guide a search from the object found to be matching the one or more keywords of the search to the higher-level object the user is likely looking for. For each object found by the keyword search of the search index, the return path methods are executed, traversing the object database and returning parent objects as specified by the method. The collection of parent objects is then ranked according to the return path method weights and the ranked list is returned to the user.

Figure 1:
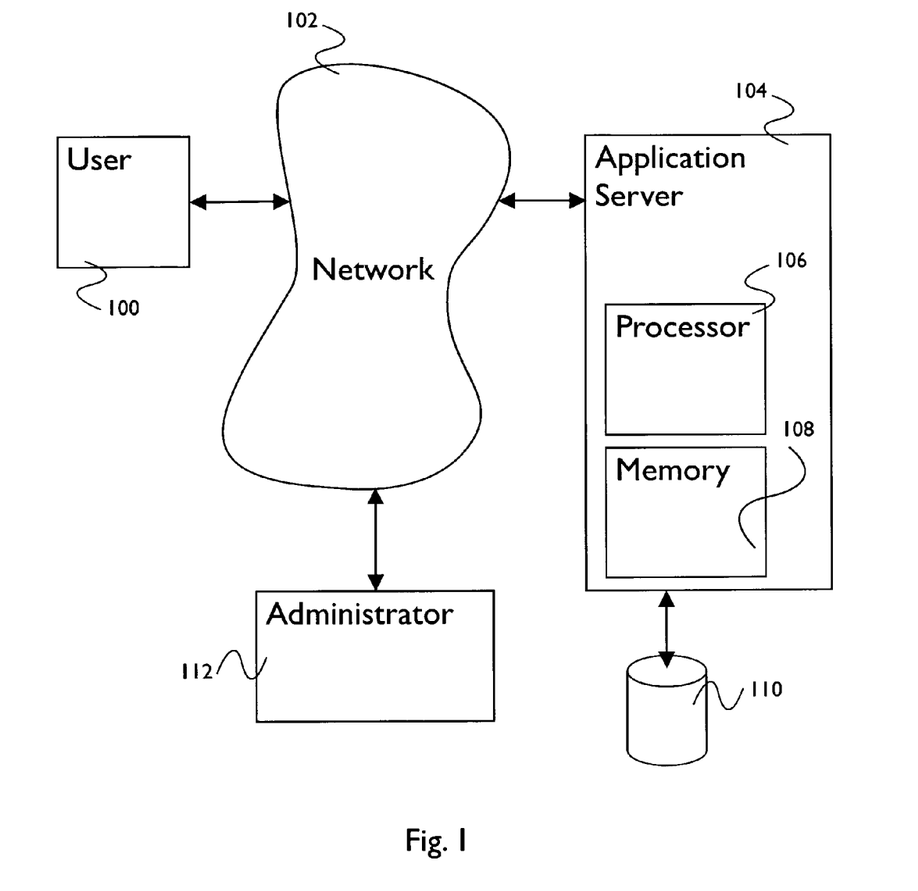
FIG. 1 is a block diagram illustrating an embodiment of a system for data storage and searching.

FIG. 1 is a block diagram illustrating an embodiment of a system for data storage and searching. In the example shown, application server 104 includes processor 106 and memory 108. Application server 104 is coupled to external storage 110 so that application server 104 is able to store information to and access information from external storage 110. Application server 104 is also coupled to network 102. In various embodiments, network 102 comprises one or more of the following: a local area network, a wide area network, a wired network, a wireless network, the Internet, or any other appropriate network. Network 102 enables user 100 and administrator 112 to access application server 104. In various embodiments, administrator 112 specifies an application that runs on application server 104, and user 100 accesses that application. The application searches for stored data. In various embodiments, stored data is related to a business requirement such as an expense report, a personnel file, data related to an employee, or any other relevant data. In various embodiments, application comprises a human resource application, an enterprise application, a business application, a financial application, or any other appropriate application.

Figure 2:
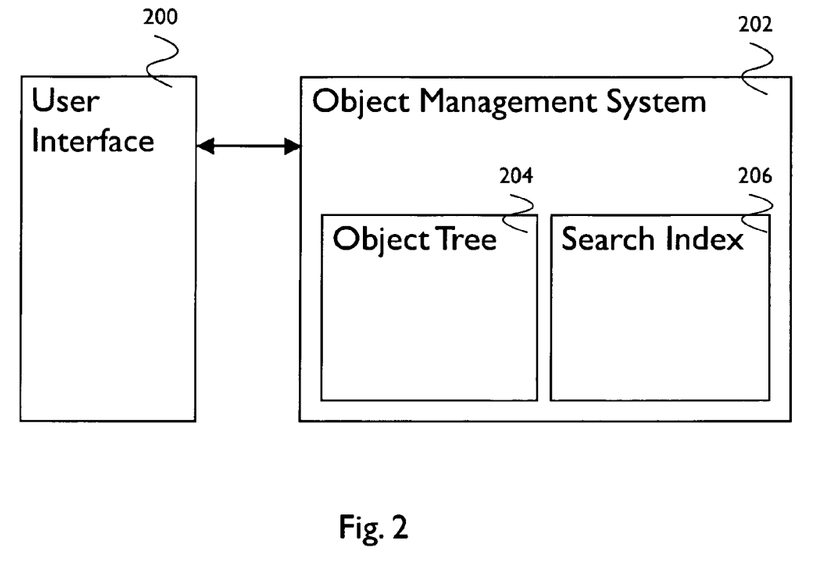
FIG. 2 is a block diagram illustrating an embodiment of a system for searching.

FIG. 2 is a block diagram illustrating an embodiment of a system for searching. In the example shown, a database user (e.g., a user such as user 100 of FIG. 1) interacts with user interface 200, providing input to and receiving output from the application server. Object management system 202 is part of an application running on an application server (e.g., an application server such as application server 104 of FIG. 1). User interface 200 communicates with object management system 202 through a network (e.g., a network such as network 102 of FIG. 1). In various embodiments, object management system 202 makes additions and/or changes to stored data, tracks additions and/or changes to stored data, and/or searches stored data. In the example shown, stored data is stored in object tree structure 204 within object management system 202. In the example shown, the capabilities of object management system 202 include data searching. Data searching is facilitated by search index 206, also stored as part of object management system 202. When a search query is provided to user interface 200, it is relayed to object management system 202 through a network connection. Object management system 202 uses search index 206 and object tree 204 to locate search results, relays the search results through the network, and outputs them via user interface 200.

Figure 3:
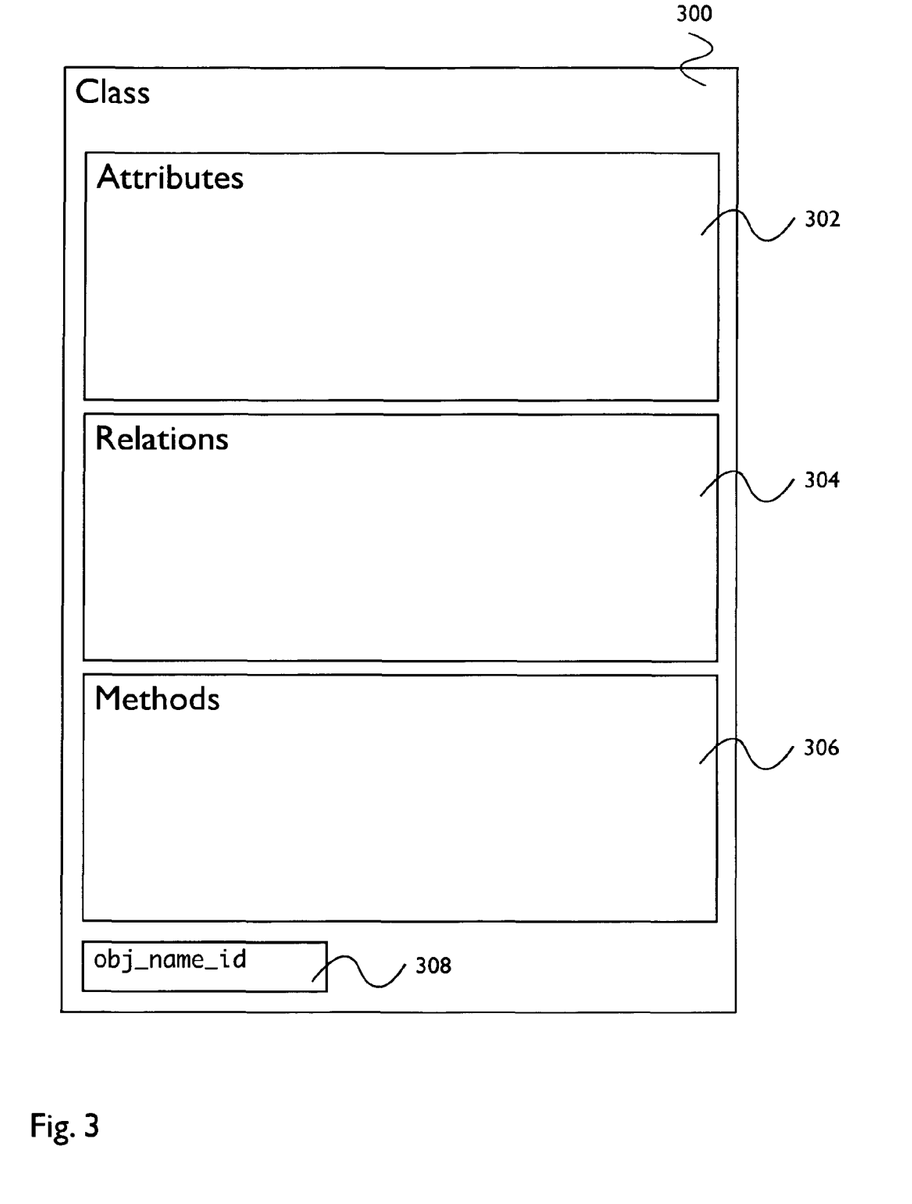
FIG. 3 is a block diagram illustrating an embodiment of a class data structure.

FIG. 3 is a block diagram illustrating an embodiment of a class data structure. In some embodiments, stored data, such as object tree data and search index data associated with object tree 204 and search index 206 of FIG. 2, is stored in class data structures of FIG. 3. In the example shown, class 300 is comprised of zero, one, or more than one attributes 302, zero, one, or more than one relationships 304, zero, one, or more than one methods 306, and object_name_id 308. Attributes 302 store data about the class, for instance, name, location, salary, title, or any other human resource, corporate, financial, legal, or medical data, or any other appropriate data. Relationships 304 store relations between a given object instance of class 300 and other object instances of the class or of other class definitions. Methods 306 define operations that can be performed with the attributes and relationships. A given class definition has a certain set of attributes and relationships, as well as a certain set of methods used to operate on those attributes and relationships. A given object instance of a class definition has defined values for each of the attributes and relationships.

In the example shown, class 300 has object_name_id 308 associated with it. In some embodiments, object_name_id 308 corresponds to the location in memory where class 300 is stored, allowing other objects to access an object of class 300.

In some embodiments, one or more of methods 306 may be designated as return path methods. In some embodiments, return path methods traverse relations and return an object that is the logical owner of the starting object. In some embodiments, a return path method may return the object itself. In some embodiments, a return path method has an associated weight, specifying the relative relevance of the object the return path method returns to the starting object.

Figure 4:
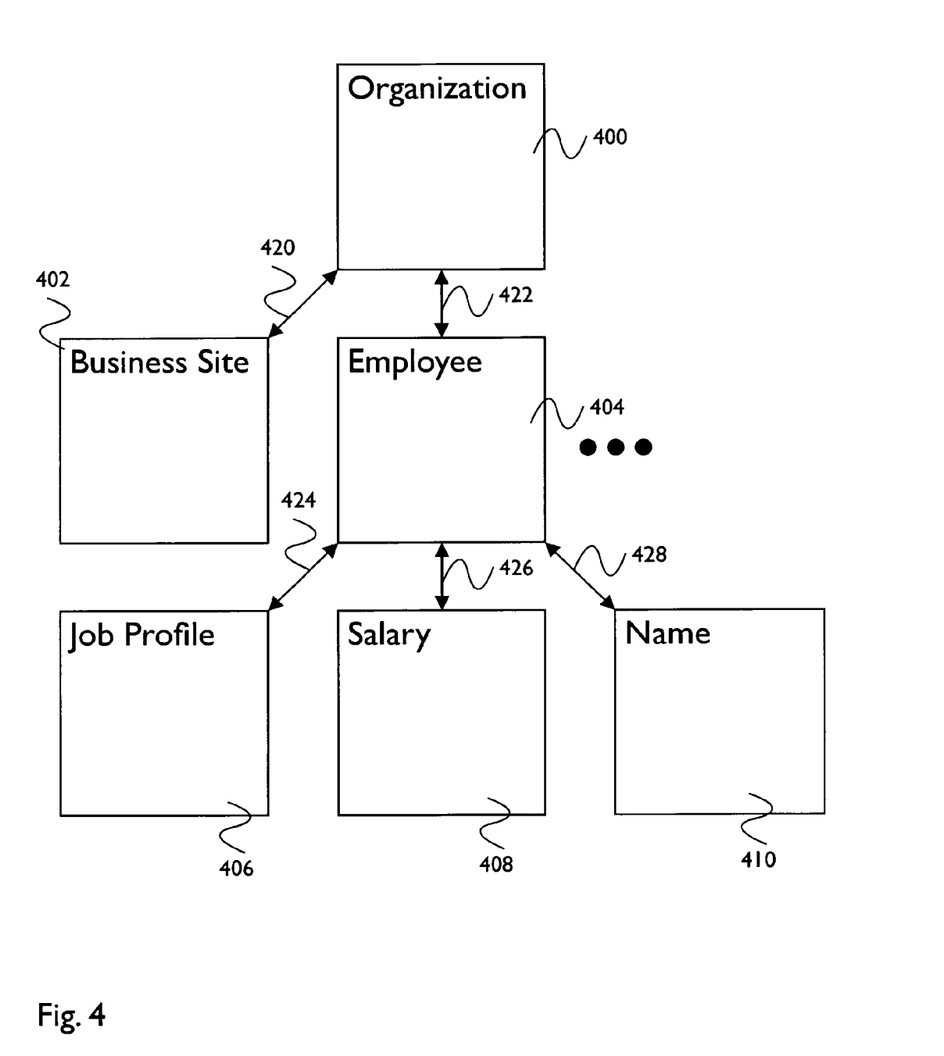
FIG. 4 is a block diagram illustrating an embodiment of a data structure for an object tree.

FIG. 4 is a block diagram illustrating an embodiment of a data structure for an object tree. In some embodiments, the object tree of FIG. 4 may be used to implement object tree 204 of FIG. 2. In some embodiments, objects 400, 402, 404, 406, 408, and 410 comprise object data structures as shown in FIG. 3. In some embodiments, relations 420, 422, 424, 426, and 428 comprise relations referred to in FIG. 3. In the example shown, objects represented in FIG. 4 represent a part of a business data structure. Organization 400 has relation 420 to business site object 402. Business site object 402 contains the name of the site at which the organization resides. Organization 400 also has relation 422 to employee objects such as employee object 404, each representing an employee that is part of the organization. Employee object 404 has relation 424, relation 426, and relation 428 to job profile object 406, salary object 408, and name object 410, respectively. Job profile object 406 includes job profile attributes corresponding to employee 404. Salary object 408 includes salary attributes corresponding to employee 404. Name object 410 includes name attributes corresponding to employee 404. In this way, data can be stored in a way representing the organizational structure of the company. In various embodiments, data comprises human resource data, enterprise data, business application data, financial data, or any other appropriate data. In some embodiments, programs can access attribute data throughout the object tree by traversing the object tree along the connections between objects given by relationships, and operate on the accessed attribute data to create a meaningful report about the organization.

Figure 5:
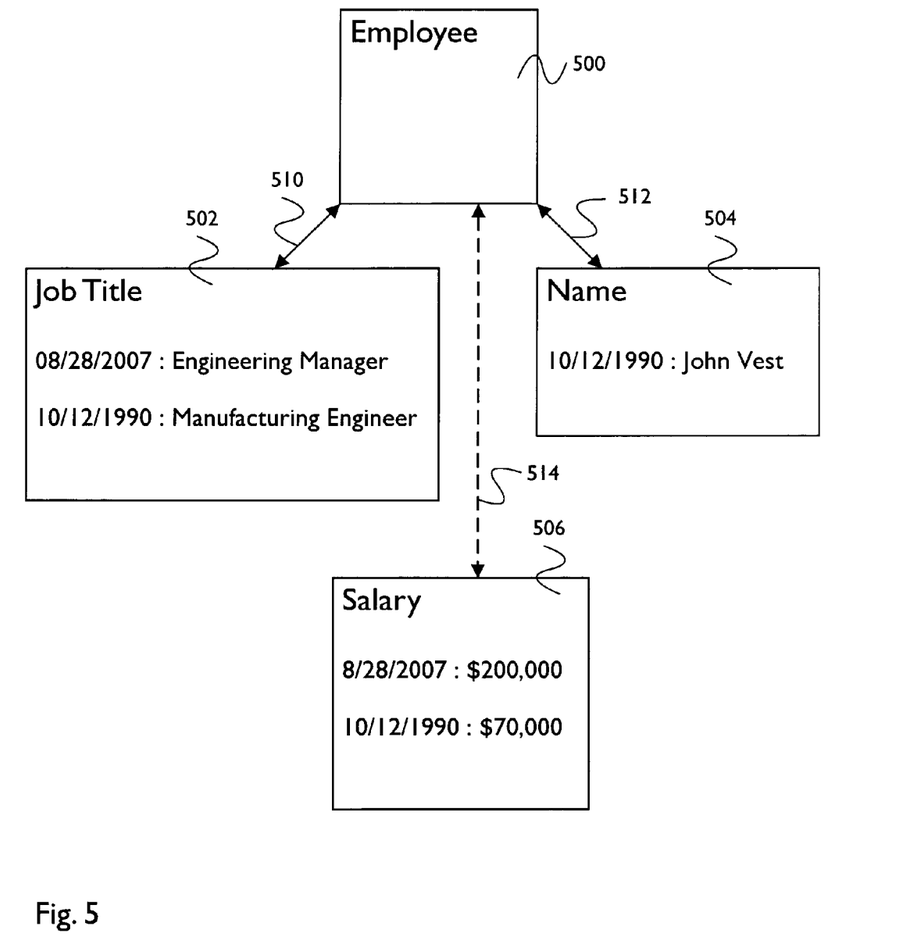
FIG. 5 is a block diagram illustrating an embodiment of a security and effective state policy for a hierarchical object tree.

FIG. 5 is a block diagram illustrating an embodiment of a security and effective state policy for a hierarchical object tree. In the example shown, employee object 500 has relations 510, 512, and 514 to job title object 502, name object 504, and salary object 506, respectively. Job title object 502 includes information about a job title for the employee associated with employee object 500. Name object 504 includes information about a name of the employee associated with employee object 500, and salary object 506 includes information about a salary of the employee associated with employee object 500. The employee represented in the example by employee object 500 is named John Vest, was hired on Oct. 12, 1990, and received a promotion and raise on Aug. 28, 2007. The information is stored in the objects by maintaining an effective date along with each piece of data. In the example shown, the original name, title, and salary of the employee are stored along with the date of hire in each object. His new salary and title after promotion are stored in the respective objects along with the dates of modification. An object can be queried for the effective state of an attribute or relation at a given date, and the correct data will be returned. Information can be gathered for an effective date in the past, present, or future.

In the example shown, any employee in the organization has the security privilege to view the name and job title of the employee represented by employee object 500, however, only some employees have the level of privilege necessary to view his salary. The solid line relations 510 and 512 and the dashed line relation 514 represent the security privilege policy in the diagram. An object management system (e.g., object management system 202 of FIG. 2) can implement this security privilege policy by providing the object ID necessary to traverse to the next object only when the user requesting the data has the correct security privilege. A user can not traverse to an object to access data unless it has the privilege to do so.

Figure 6:
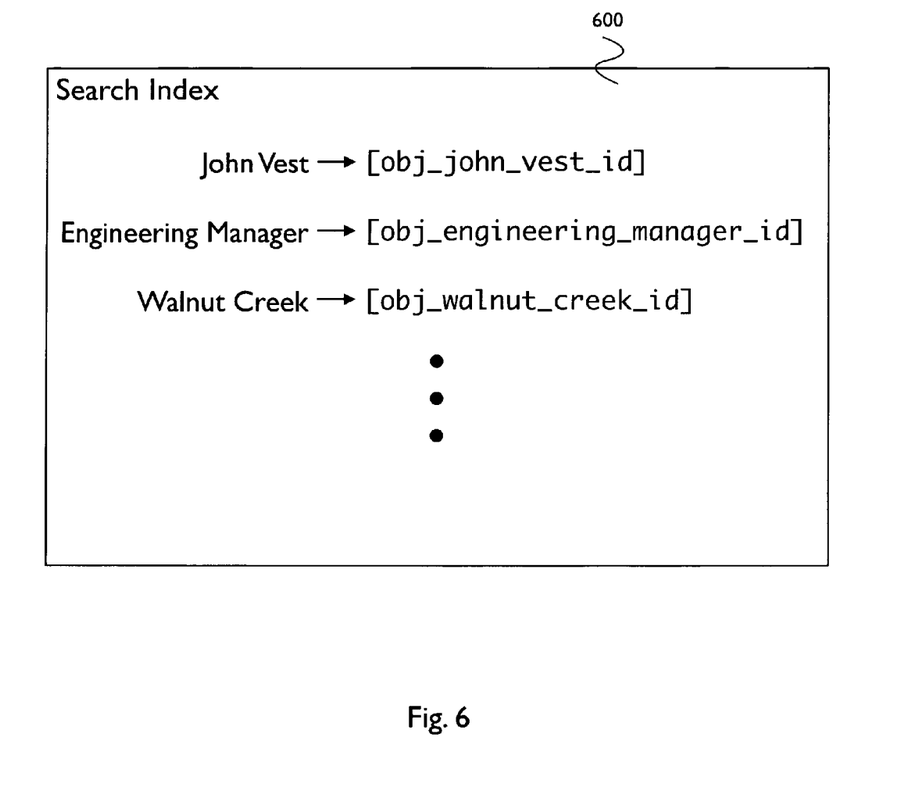
FIG. 6 is a diagram illustrating an embodiment of a search index.

FIG. 6 is a diagram illustrating an embodiment of a search index. In some embodiments, the search index of FIG. 6 comprises search index 206 of FIG. 2. In the example shown, search index 600 contains one or more listings for each object stored in the object tree of FIG. 4. Each text object attribute for each object in the object tree corresponds to a line in the search index. Text entries in the search index point to the ID number of the object containing the text attribute. If the search index is searched for text and the text is found, the associated object ID is returned, enabling the object management system to access the object containing the text. For example, if 'John', 'Vest', or 'John Vest' is searched for, the index would indicate that 'obj_john_vest_id' should be returned; if 'engineering', 'manager', or 'engineering manager' is searched for, the index would indicate that 'obj_engineering_manager_id' should be returned; and if 'walnut', 'creek', or 'walnut creek' is searched for, the index would indicate that 'obj_walnut_creek_id' should be returned. In some embodiments, if the search text is found in multiple places, all of the associated objects are returned.

Figure 7:
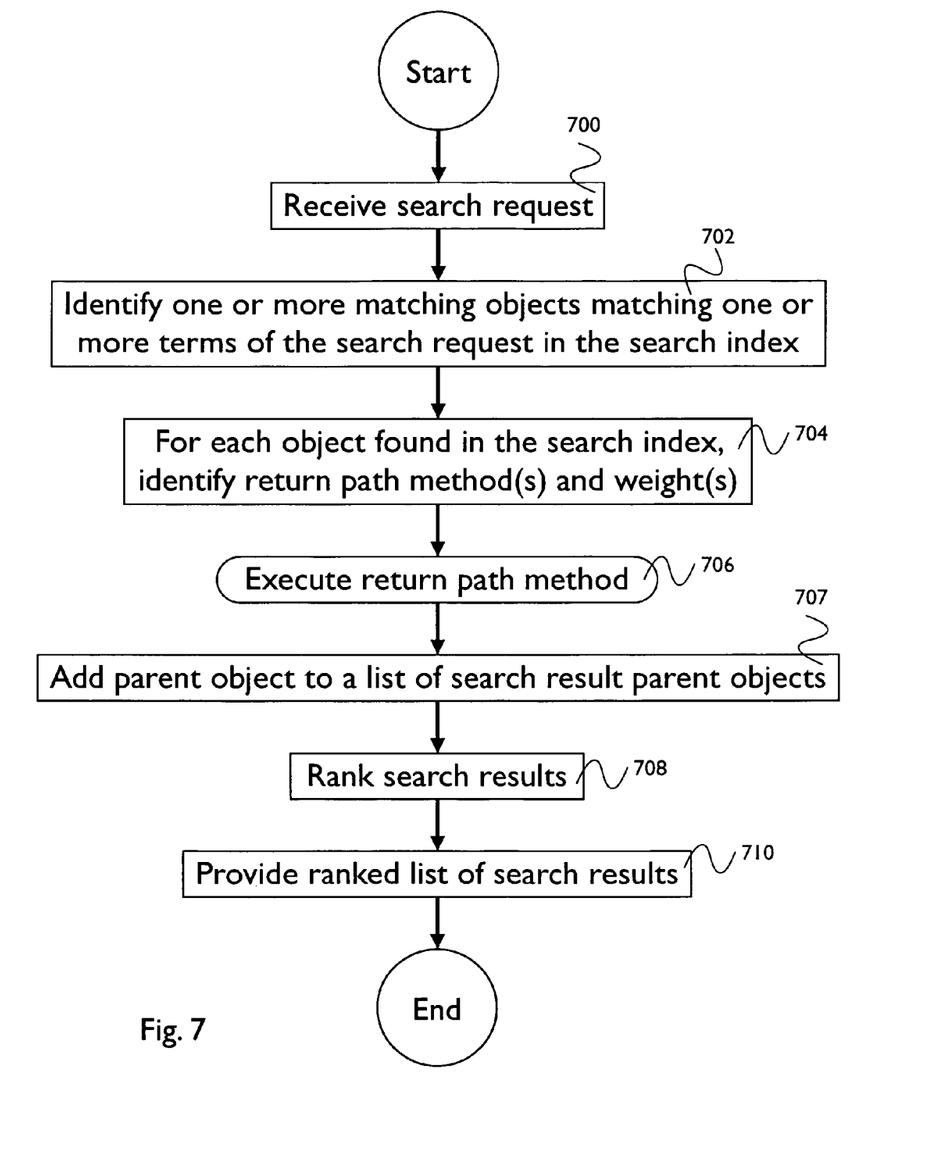
FIG. 7 is a flow diagram illustrating an embodiment of a process for searching.

FIG. 7 is a flow diagram illustrating an embodiment of a process for searching. In some embodiments, the process of FIG. 7 is used by object management system 202 of FIG. 2 to search object tree 204 of FIG. 2 with the assistance of search index 206 of FIG. 2. In the example shown, in 700, a search request is received. The search is entered by the user into the user interface and relayed to the object management system. In 702, one or more matching objects matching one or more terms of the search request in the search index are identified. For each match the search index finds to the search request, it returns an object ID to the object management system. The object management system uses the object IDs to retrieve the objects with text found in the search index. In 704, for each object found in the search index, return path method(s) and weight(s) is/are identified. In some embodiments, weights associated with the return path methods are retrieved from the objects. In 706, the return path method(s) is/are executed. A return path method traverses the object tree from the object found in the search index and returns a parent object. In 707, the parent object is added to a list of search result parent objects. In 708, search results are ranked. In some embodiments, the return path methods have associated weights and the weights are used to rank the collection of objects and form a ranked list. In some embodiments, if a parent object is returned by the return path method of multiple objects found separately in the search index, the weights are summed to rank the found object more highly in the ranked list. In 710, the ranked list of search results is provided. The list of search results is provided by the object management system to the user interface and displayed to the user.

Figure 8:
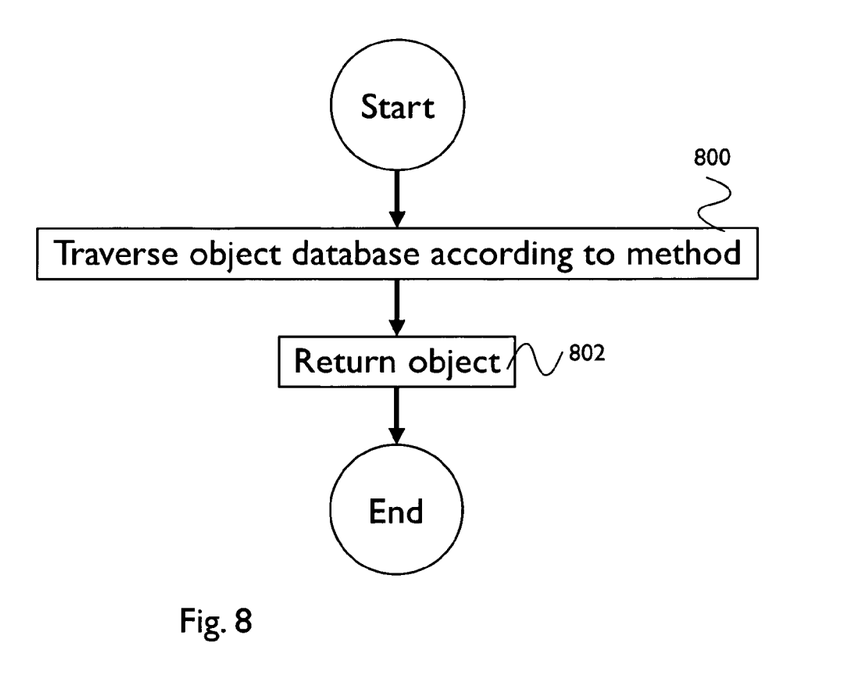
FIG. 8 is a flow diagram illustrating an embodiment of a process for executing a return path method.

FIG. 8 is a flow diagram illustrating an embodiment of a process for executing a return path method. In some embodiments, the process of FIG. 8 implements 706 of FIG. 7. In the example shown, in 800 the object management system traverses the hierarchy in the object database according to the return path method. The traverse is executed according to the return path method until the predefined destination object is accessed. In some embodiments, security and/or effective state policies as described in FIG. 5 are enforced while traversing objects. In some embodiments, when a security policy is used, the return path method is executed along with knowledge of the user performing the search. Depending on the security privilege of the user, traversal of certain relations by the return path method may or may not be allowed by the object management system. In some embodiments, when an effective state policy is used, the search query is performed with respect to a certain date. In various embodiments, the date may be before, after, or the same as the current date. In some embodiments, when an object is queried for an attribute or a relation by the return path method, the result returned by the object is the appropriate result for the date specified. In 802, the object found by the return path method is returned to the search process, and the process ends. The object returned comprises a path or identifier enabling access to the object. In some embodiments, an initial attribute value is returned along with a path or identifier enabling access to the object, so that the list or display can be provided to a user that includes the initial attribute value. For example, a return path method for an object identified by 'obj_john_vest_id' may return an initial attribute value of 'John' from a first name object and 'Vest' from a last name object that can be displayed in a search result list.

Figure 9:
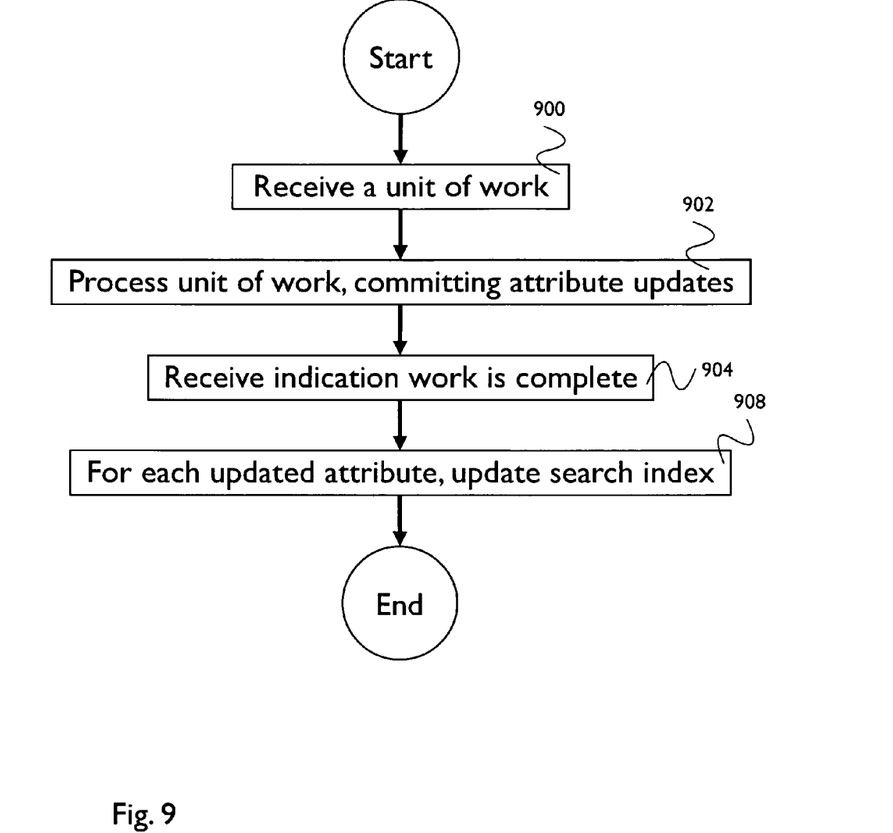
FIG. 9 is a flow diagram illustrating an embodiment of a process for maintaining a search index.

FIG. 9 is a flow diagram illustrating an embodiment of a process for maintaining a search index. In some embodiments, the process of FIG. 9 is executed by object management system 202 of FIG. 2 when a request to modify object tree 204 of FIG. 2 is received. In the example shown, in 900 a unit of work is received. The unit of work is to be performed by the object management system on the object tree. In 902, the unit of work is processed and attribute updates are committed to a persistent store. Any modifications to object attributes including additions, deletions, and/or modifications to existing object attributes performed in the course of the unit of work are committed by the object management system. In 904, the object management system receives an indication that the unit of work has been completed. In some embodiments, the indication is received when the unit of work is about to be completed. In 908 the search index is updated for each attribute update committed. When the search index has been updated to reflect each update committed to object attributes of objects in the object tree, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method for searching, comprising:
   identifying one or more matching objects matching one or more terms of a search request in a search index;
   executing one or more return path methods associated with each of the one or more matching objects; wherein each of the one or more return path methods traverses an object tree and returns a parent object, wherein the parent object is added to a list of search result parent objects, wherein the data associated with the parent object is stored along with modification dates,
   wherein the search request further comprises an evaluation date;
   and wherein the parent object is stored with one or more effective dates, wherein each effective date comprises a past, present or future date;
   and wherein an effective state of the parent object is determined at the evaluation date by comparing the evaluation date to one or more of the effective dates;
   ranking the list of search result parent objects according to a ranking function; and
   providing the ranked list of search result parent objects.

2. A method as in claim 1, further comprising receiving a search request.

3. A method as in claim 1, wherein the object tree comprises a network of objects that store data.

4. A method as in claim 1, wherein data stored in the object tree comprises one or more of the following: human resource data, enterprise data, business application data, and financial data.

5. A method as in claim 1, wherein the search index is based on the data stored in the network of objects comprising the object tree.

6. A method as in claim 1, further comprising maintaining the search index based on the object tree.

7. A method as in claim 1, wherein the one or more return path methods each have an associated weight.

8. A method as in claim 7, wherein the associated weight is used by the ranking function.

9. A method as in claim 8, wherein the associated weight is summed with one or more other associated weights associated with each of the one or more other return path methods, in the event that one of the one or more return path methods returns a parent object identical to a parent object returned by another one of the one or more return path methods, wherein the sum of the associated weights enables the first parent object to be ranked higher in the list.

10. A method as in claim 1, wherein a security policy is enforced while the one or more return path methods traverses the object tree.

11. A method as in claim 1, wherein the one or more return path methods is associated with a user that requested the search request.

12. A method as in claim 1, wherein an effective state policy is enforced while the one or more return path methods traverses the object tree.

13. A method as in claim 1, wherein the one or more return path methods returns an initial attribute value.

14. A computer program product for searching, the computer program product being embodied in a non-transitory computer readable storage medium and comprising computer instructions for:
  identifying one or more matching objects matching one or more terms of a search request in a search index;
  executing one or more return path methods associated with each of the one or more matching objects; wherein each of the one or more return path methods traverses an object tree and returns a parent object, wherein the parent object is added to a list of search result parent objects, wherein the data associated with the parent object is stored along with modification dates,
  wherein the search request further comprises an evaluation date;
  and wherein the parent object is stored with one or more effective dates, wherein each effective date comprises a past, present or future date;
  and wherein an effective state of the parent object is determined at the evaluation date by comparing the evaluation date to one or more of the effective dates;
  ranking the list of search result parent objects according to a ranking function; and
  providing the ranked list of search result parent objects.

15. A system for searching, comprising:
  a processor; and
  a memory coupled with the processor, wherein the memory is configured to provide the processor with instructions which when executed cause the processor to:
    identify one or more matching objects matching one or more terms of a search request in a search index;
    execute one or more return path methods associated with each of the one or more matching objects; wherein each of the one or more return path methods traverses an object tree and returns a parent object, wherein the parent object is added to a list of search result parent objects, wherein the data associated with the parent object is stored along with modification dates,
    wherein the search request further comprises an evaluation date;
    and wherein the parent object is stored with one or more effective dates, wherein each effective date comprises a past, present or future date;
    and wherein an effective state of the parent object is determined at the evaluation date by comparing the evaluation date to one or more of the effective dates;
    rank the list of search result parent objects according to a ranking function; and provide the ranked list of search result parent objects.

16. A system as in claim 15, wherein the processor is further configured to receive a search request.

17. A system as in claim 15, wherein the object tree comprises a network of objects that store data.

18. A system as in claim 15, wherein data stored in the object tree comprises one or more of the following: human resource data, enterprise data, business application data, and financial data.

19. A system as in claim 15, wherein the search index is based on the data stored in the network of objects comprising the object tree.

20. A system as in claim 15, wherein the processor is further configured to maintain the search index based on the object tree.

21. A system as in claim 15, wherein the one or more return path methods each have an associated weight.

22. A system as in claim 21, wherein the associated weight is used by the ranking function.

23. A system as in claim 22, wherein the associated weight is summed with one or more other associated weights associated with each of the one or more other return path methods, in the event that one of the one or more return path methods returns a parent object identical to a parent object returned by another one of the one or more return path methods, wherein the sum of the associated weights enables the parent object to be ranked higher in the list.

24. A system as in claim 15, wherein a security policy is enforced while the one or more return path methods traverses the object tree.

25. A system as in claim 15, wherein the one or more return path methods is associated with a user that requested the search request.

26. A system as in claim 15, wherein evaluating the effective state of the parent object further comprises using an effective state policy, wherein an effective state policy is enforced while the one or more return path methods traverses the object tree, wherein enforcing the effective state policy comprises returning the state of an attribute or relation data of the parent object at the evaluation date.

27. A system as in claim 15, wherein the one or more return path methods returns an initial attribute value.

* * * * *